(12) United States Patent  
Eversull et al.

(10) Patent No.: US 12,478,781 B2  
(45) Date of Patent: Nov. 25, 2025

(54) APPARATUS AND SYSTEMS FOR HIS BUNDLE LEAD PLACEMENT

(71) Applicants: Christian Scott Eversull, Palo Alto, CA (US); Christopher E. Woods, Palo Alto, CA (US); Stephen A. Leeflang, Sandy, UT (US)

(72) Inventors: Christian Scott Eversull, Palo Alto, CA (US); Christopher E. Woods, Palo Alto, CA (US); Stephen A. Leeflang, Sandy, UT (US)

(73) Assignee: CLPH, LLC, Palo Alto, CA (US)

( * ) Notice: Subject to any disclaimer, the term of this patent is extended or adjusted under 35 U.S.C. 154(b) by 1661 days.

(21) Appl. No.: 16/458,034

(22) Filed: Jun. 29, 2019

(65) Prior Publication Data

US 2020/0001070 A1   Jan. 2, 2020

Related U.S. Application Data

(60) Provisional application No. 62/692,652, filed on Jun. 29, 2018.

(51) Int. Cl.
  *A61N 1/05* (2006.01)
  *A61M 25/00* (2006.01)

(52) U.S. Cl.
  CPC ......... *A61N 1/057* (2013.01); *A61M 25/0068* (2013.01); *A61M 2210/125* (2013.01); *A61M 2230/04* (2013.01); *A61N 2001/058* (2013.01)

(58) Field of Classification Search
  None
  See application file for complete search history.

(56) References Cited

U.S. PATENT DOCUMENTS

| | | | |
|---|---|---|---|
| 6,203,531 B1 * | 3/2001 | Ockuly | A61M 25/0041 606/108 |
| 2005/0234436 A1 * | 10/2005 | Baxter | A61B 18/24 606/41 |
| 2007/0112405 A1 * | 5/2007 | Williams | A61M 25/0041 607/122 |
| 2014/0067036 A1 * | 3/2014 | Shuros | A61N 1/0573 606/129 |
| 2019/0298990 A1 * | 10/2019 | De Kock | A61M 25/0041 |
| 2021/0045644 A1 * | 2/2021 | Kramer | A61B 5/318 |

FOREIGN PATENT DOCUMENTS

| | | | |
|---|---|---|---|
| EP | 829270 A2 * | 3/1998 | ........ A61M 25/0041 |
| WO | WO-9713542 A1 * | 4/1997 | ........ A61M 25/0041 |

* cited by examiner

*Primary Examiner* — Kennedy Schaetzle
(74) *Attorney, Agent, or Firm* — William A. English; Vista IP Law Group LLP

(57) ABSTRACT

Apparatus, systems, and methods are provided for placing pacing leads or other devices within a patient's heart. In an exemplary embodiment, the apparatus includes a tubular member comprising a flexible distal portion defining a curvilinear shape in a relaxed state including a curved first region defining a first radius lying within a first plane, a substantially straight second region extending from the first curved region defining a first length, and a curved third region extending from the second region defining a second radius smaller than the first radius.

16 Claims, 3 Drawing Sheets

US 12,478,781 B2

APPARATUS AND SYSTEMS FOR HIS BUNDLE LEAD PLACEMENT

RELATED APPLICATION DATA

This application claims benefit of co-pending U.S. provisional application Ser. No. 62/692,652, filed Jun. 29, 2018, the entire disclosure of which is expressly incorporated by reference herein.

FIELD OF THE INVENTION

The present invention relates generally to apparatus, systems, and methods for delivering devices into a patient's body, e.g., into a patient's heart, and, more particularly, to sheaths, catheters, and other tubular devices for accessing a patient's heart and delivering leads for placement against the heart wall adjacent the His bundle or fast conduction system of the heart and to systems and methods including such tubular devices.

BACKGROUND

For pacing indications arising below the sinoatrial ("SA") node, e.g., heart block, atrioventricular ("AV") node dysfunction, bundle branch block and/or slowed conduction, and the like, pacing at or near the physiologic fast conduction pathways is believed to potentially more closely restore physiologic function of the diseased heart. For example, such pacing and the resulting physiologic conduction can lead to more organized and functional depolarization of the ventricles leading to increased pump function and/or to more coordinated contraction of the ventricles, e.g., facilitating cardiac resynchronization. Thus, placement of pacing leads or other pacing devices such that they capture these fast conducting pathways may be beneficial. This includes the His bundle, para-hisian locations, the bundle branches, and the like.

Accordingly, apparatus, systems, and methods for placing such devices would be beneficial.

SUMMARY

The present invention is directed generally to apparatus, systems, and methods for delivering devices into a patient's body, e.g., into a patient's heart. More particularly, the present invention relates to sheaths, catheters, and other tubular devices for accessing a patient's heart and delivering leads for placement against the heart wall adjacent the His bundle and/or other regions of the heart's electrical conduction system, including the bundle branches, and to systems and methods including such tubular devices.

In an exemplary embodiment, the apparatus may include a sheath or other delivery device that may facilitate placement of a lead or other implant within a patient's heart, e.g., the delivery device including a distal portion that is biased to a predetermined shape, e.g., a predetermined curvilinear shape, that orients a distal tip of the tubular device substantially perpendicular or orthogonal to a wall of the heart and/or against a desired region. In addition or alternatively, the distal portion of the delivery device may include one or more regions having predetermined shapes to enhance manipulation and/or positioning of the distal tip within the patient's heart.

Thus, a lead introduced through the delivery device may be oriented substantially perpendicular or orthogonal to the wall and/or placed directly at a target location, e.g., secured to the wall at the target location using one or more fixation elements on the distal end of the lead. Optionally, the delivery device may include one or more electrodes, sensors, or other elements that may be able to identify or assist in identifying structures of the heart, e.g., identifying the His bundle, left bundle branch, or other structures of the heart's conductive system, so that a lead may be placed and secured to the wall adjacent the target structure.

In accordance with one embodiment, an apparatus is provided for delivering a lead or other secondary device into a patient's heart that includes an elongate tubular member comprising a proximal end, a distal end sized for introduction into a patient's body, and a lumen extending therebetween, wherein the tubular member comprises a flexible distal portion defining a curvilinear shape in a relaxed state including a curved first region defining a first radius lying within a first plane, a substantially straight second region extending from the first curved region defining a first length, and a curved third region extending from the second region defining a second radius smaller than the first radius.

In accordance with another embodiment, a system is provided for delivering a lead or other secondary device into a patient's heart that includes a delivery device comprising an elongate tubular member comprising a proximal end, a distal end sized for introduction into a patient's body, and a lumen extending therebetween, the tubular member comprising a flexible distal portion defining a curvilinear shape in a relaxed state including a curved first region defining a first radius lying within a first plane, a substantially straight second region extending from the first curved region defining a first length, and a curved third region extending from the second region defining a second radius smaller than the first radius; and a lead comprising a distal portion sized for introduction through the lumen of the delivery device and a fixation element on the distal portion for securing the distal portion to a wall of the patient's heart.

In accordance with yet another embodiment, a method is provided for delivering a lead or other secondary device into a patient's heart that includes introducing a distal end of a tubular member into a right atrium of the patient's heart; deploying a distal portion in a curvilinear shape state including a curved first region defining a first radius lying within a first plane, a substantially straight second region extending from the first curved region defining a first length, and a curved third region extending from the second region to a distal tip, the third region defining a second radius smaller than the first radius; placing the distal tip against a wall of the right atrium; manipulating the tubular member to move the distal tip relative to the wall; detecting electrical signals from one or more electrodes on the distal tip to identify a His bundle of the heart adjacent the wall; after identifying that the distal tip is positioned adjacent the His bundle, introducing a distal end of an implantable device through a lumen of the tubular member; securing the distal end of the implantable device to the wall adjacent the His bundle; and removing the tubular device.

In accordance with still another embodiment, a method is provided for delivering a lead or other secondary device into a patient's heart that includes introducing a distal end of a tubular member into a right atrium of the patient's heart; deploying a distal portion in a curvilinear shape state including a curved first region defining a first radius lying within a first plane, a substantially straight second region extending from the first curved region defining a first length, and a curved third region extending from the second region to a distal tip, the third region defining a second radius smaller than the first radius; placing the distal tip against a wall of the right atrium; manipulating the tubular member to move the distal tip relative to the wall; detecting electrical signals from one or more electrodes on the distal tip to identify a His bundle of the heart adjacent the wall; after identifying that the distal tip is positioned adjacent the His bundle, introducing a distal end of an implantable device through a lumen of the tubular member; securing the distal end of the implantable device to the wall adjacent the His bundle; and removing the tubular device.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Before the exemplary embodiments are described, it is to be understood that the invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

Figure 1:
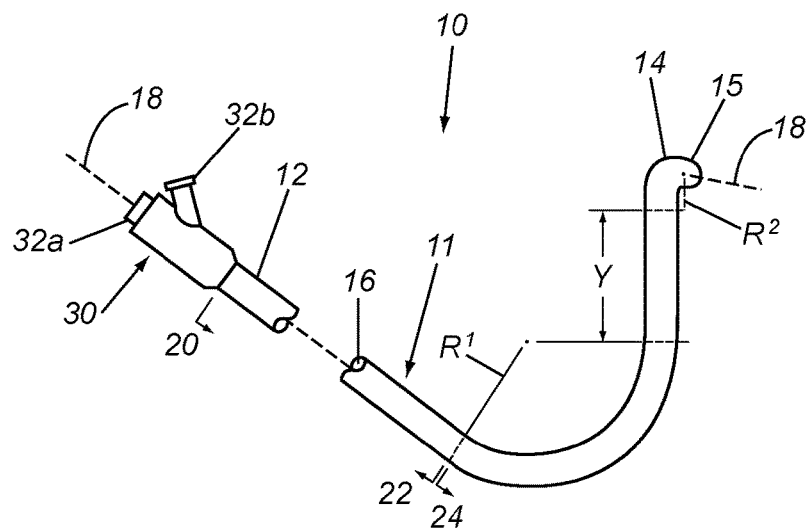
FIG. 1 is a perspective view of an exemplary embodiment of a delivery sheath including a flexible distal portion having a predetermined curvilinear shape.
Figure 2:
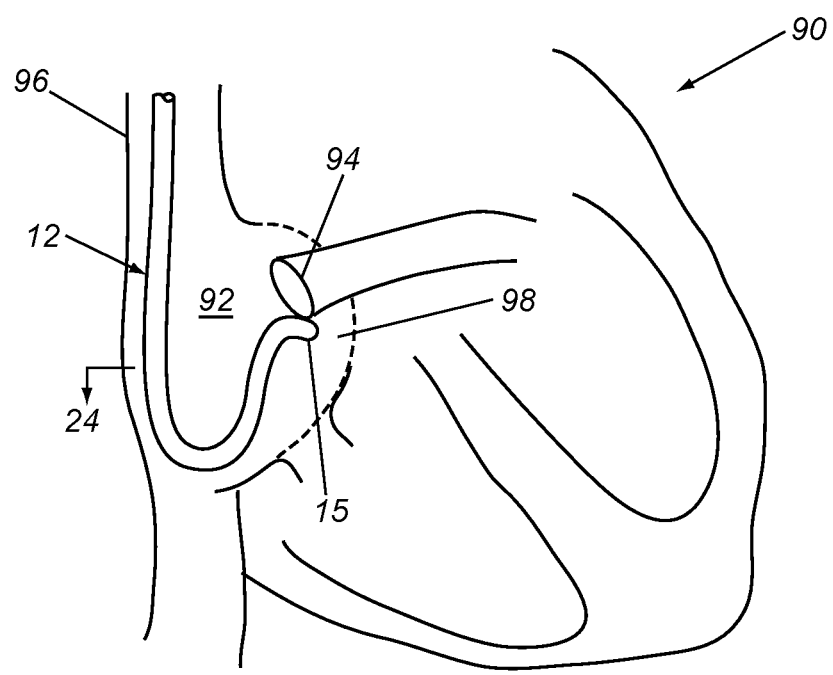
FIG. 2 is a cross-sectional view of a heart showing the distal portion of the sheath of FIG. 1 being introduced into a right atrium of the heart.

Turning to the drawings, FIG. 1 shows an exemplary embodiment of an apparatus 10 for delivering a lead, implant, or other secondary device (not shown) into a patient's body, e.g., into a patient's heart 90 as shown in FIG. 2. Generally, the apparatus 10 includes an elongate tubular body 11 including a proximal end 12, a distal end 14 sized for introduction into a body lumen and terminating in a distal tip 15, and a lumen 16 extending between the proximal and distal ends 12 and 14 along longitudinal axis 18 to an outlet 19 in the distal tip 15. Optionally, the apparatus 10 may include one or more additional lumens (not shown), which may be disposed concentrically around, side-by-side with, or otherwise adjacent the lumen 16. The lumen 16 may be sized for receiving a cardiac lead, pacing device, or other secondary device (not shown), e.g., intended for implantation within the heart 90, as described further elsewhere herein.

The tubular body 11 may be constructed from one or more layers, e.g., an inner liner surrounding the lumen 16, a reinforcing layer surrounding the inner liner, and an outer layer (not shown). Optionally, one or more coatings (also not shown) may be applied to the inner surface of the inner liner. In an exemplary embodiment, a hydrophilic coating, such as Polyvinylpyrrolidone, may be sprayed or otherwise applied onto the surface of the inner liner during fabrication to provide a lubricious inner surface for the lumen 16 of the tubular body 11. The layers of the tubular body 11 may be attached to one another, e.g., by laminating, adhering, adhesive bonding, ultrasonic welding, reflowing or other heating, and the like. Exemplary materials and methods for making the tubular body 11 are disclosed in co-pending applications Ser. No. 11/340,904, filed Jan. 26, 2006, Ser. No. 11/670,958, filed Feb. 2, 2007, Ser. No. 12/254,818, filed Oct. 20, 2008, and Ser. No. 12/551,540, filed Aug. 31, 2009, the entire disclosures of which are expressly incorporated by reference herein.

In one embodiment, one or more of the layers of the apparatus 10 may have a substantially homogenous construction between the proximal and distal ends 12, 14. Alternatively, the construction may vary along the length of the apparatus 10 to provide desired properties, e.g., between or within proximal, intermediate, and distal portions 20, 22, 24. For example, a proximal portion 20 of the apparatus 10 adjacent the proximal end 12 may be substantially rigid or semi-rigid, e.g., providing sufficient column strength and/or torque to allow the distal end 14 of the apparatus 10 to be pushed or otherwise manipulated from the proximal end 12, while the distal portion 24 may be relatively or substantially flexible. As described further below, the distal portion 24 of the apparatus 10 may define a predetermined curvilinear shape in a relaxed state, e.g., may be biased to the curvilinear shape. In addition or alternatively, the distal portion 24 may be deflected or deflectable to other shapes, e.g., by inserting a secondary device into the lumen 16 to at least partially straighten the distal portion 24 and/or the distal portion 24 may be steerable, i.e., may include one or more pull wires or actuators, and/or be bent, curved, or otherwise deflected into or out of the curvilinear shape, as described further below. In addition, or alternatively, the distal portion 24 of the apparatus 10 which defines a curvilinear shape may vary in construction along its length to provide desired properties. For example, the construction and resulting stiffness of the distal portion 24 may vary along its length in order to facilitate desired navigation or positioning within the heart, e.g., as further described below.

In addition, the reinforcing layer or the material of the outer layer and/or the composite construction of the catheter shaft may allow the apparatus 10 to be twisted from the proximal end 12, e.g., to rotate the distal end 14 within a patient's body. Thus, the distal end 14 of the apparatus 10 may be manipulated within a patient's body from the proximal end 12 without substantial risk of buckling and/or kinking. Optionally, the outer layer at or adjacent the distal end 14 may be substantially flexible or semi-rigid, e.g., to allow the distal portion 24 to bend easily or otherwise be advanced through tortuous anatomy and/or provide a substantially atraumatic distal tip 15.

Optionally, the outer layer or composite construction of the catheter body 11 at or adjacent the distal end 14 may be substantially flexible or semi-rigid or vary along its length, e.g., to allow the distal portion 24 to bend easily or otherwise be advanced through tortuous anatomy, and/or to enable stable and precise positioning of the distal tip 15 at a predetermined electrophysiologic location (e.g., the His bundle, left bundle branch, etc., as determined by electrical signals) within the heart where the spatial position or geometry of such predetermined electrophysiologic location may vary from patient to patient due to anatomical variation. Exemplary outer layers and/or shaft constructions that may be included in the apparatus 10 and methods for making them are disclosed in U.S. Pat. Nos. 4,478,898, 4,863,442, 5,217,440, 5,254,107, 5,676,659, 5,811,043, 5,836,926, 6,004,310, 6,669,886, 6,837,890, and 6,945,970, the entire disclosures of which are expressly incorporated by reference herein.

In exemplary embodiments, the tubular body 11 may have an outer diameter between about half and twenty millimeters (0.5-20 mm) or between about one and five millimeters (1-5 mm), and a length between about five and one hundred fifty centimeters (5-150 cm). The inner liner may have a wall thickness between about 0.0001-0.01 inch (0.0025-0.25 mm) and the outer layer may have a wall thickness between about 0.0005-0.2 inch (0.0127-5.08 mm).

With continued reference to FIG. 1, a hub or handle 30 may be provided on the proximal end 12, e.g., configured and/or sized for holding and/or manipulating the apparatus 10 from the proximal end 12. In addition, the hub 30 may include one or more ports, e.g., port 32a communicating with the lumen 16. Optionally, the port 32a may include one or more valves, e.g., a hemostatic valve (also not shown), which may provide a substantially fluid-tight seal, while accommodating insertion of one or more devices, e.g., a pacing lead, into the lumen 16. In addition or alternatively, a side port 32b may be provided on the handle 30, e.g., for delivering fluid into and/or aspirating fluid from the lumen 16, e.g., around a device inserted into the lumen 16.

Optionally, the hub 30 may include one or more actuators, such as sliders, buttons, switches, rotational actuators, and the like, e.g., for activating and/or manipulating components (also not shown) on the distal end 14 or otherwise operating the apparatus 10. For example an actuator may be provided that is coupled to a steering element within an auxiliary lumen (not shown) that may be manipulated to direct the distal portion 24 between the curvilinear shape and/or one or more other shapes, as described elsewhere herein.

In addition or alternatively, the hub 30 may include one or more features to facilitate slitting the hub 30 and tubular body 11, e.g., after introducing a lead or other implantable device through the lumen 16. For example, the hub 30 and tubular body 11 may include one or more of a notch, a thin-walled region, an annealed braid and the like (not shown) extending distally from the hub 30 at least partially along the tubular body 11, which may facilitate using a cutting tool to slit the hub 30 and the tubular body 11 to allow removal while leaving the lead within the patient's body.

Figure 1A:
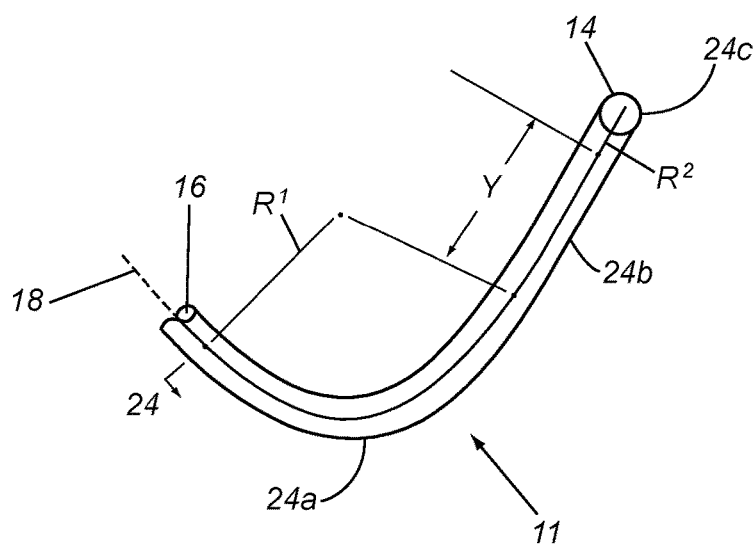
FIG. 1A is a detail of the distal portion of the sheath of FIG. 1 within a plane defined by a first curved region of the distal portion.

With additional reference to FIG. 1A, in the exemplary embodiment shown, the distal portion 24 may include a first region 24a (the approximate region between R1 and proximal end of length Y) defining a curve in a relaxed state having a first radius R1 lying within a first plane (within the plane of the image), a substantially straight second region 24b (the approximate region defined by length Y) extending from the first curved region 24a defining a first length Y, and a third region 24c (the approximate region distal to length Y) extending from the second region 24b defining a curve in a relaxed state having a second radius R2 smaller than the first radius R1.

Alternatively, the first region 24a may transition directly or substantially directly into the third region 24c, e.g., forming a substantially continuous curvilinear shape defined by two radii R1 and R2, each with a predetermined arc length. Further alternatively, the second region 24b may include a curvilinear joining segment between regions 24a and 24c.

In addition, optionally, the third region 24c may extend out of the plane of the first region 24a in the relaxed state, e.g., in a posterior direction (defining a left hand curve relative to the first region 24a) or, alternatively, in an anterior direction (defining a right hand curve relative to the first region 24a). In an exemplary embodiment, the curve of the second radius may lie within a second plane orthogonal to the first plane, e.g., such that the longitudinal axis 18 within the third region 24c turns about ninety degrees (90°) and is substantially perpendicular at the distal tip 15 compared to the first and second regions 24a, 24b. Further alternatively, the curved regions 24a and/or 24c may include a complex curve that is not defined by a single radius and/or a single plane, where the such curve is defined, for example, by a spline and a length.

In this manner, the distal portion 24 may be oriented within the patient's body, for example, within a chamber of the patient's heart 90, e.g., within the right atrium 92 as shown in FIG. 2, or right ventricle (not shown), to position the distal tip 15 against a wall of the heart 90, e.g., the septum 98, e.g., adjacent the coronary sinus 94. For example, the distal portion 24 may be sufficiently flexible to be partially straightened, e.g., by insertion of a dilator (not shown), and/or otherwise oriented to accommodate advancement through the patient's vasculature, e.g., through the superior vena cava 96 into the right atrium 92 as shown in FIG. 2. Once the entire distal portion 24 is exposed within the right atrium 92, the distal portion 24 may be biased to automatically adopt the curvilinear shape, thereby orienting the distal tip 15 towards target anatomy, e.g., towards the septum 98. Furthermore, the distal tip 15 may be constructed with an angle or bevel at its distal aspect, which bevel is designed to orient the face of the tip orthogonal to a wall of the heart 90, e.g. as is described elsewhere herein. Consequently, an outlet 19 of the lumen 16 may be positioned against the wall such that a secondary device, e.g., a pacing lead (not shown) introduced through the lumen 16 may be directed through the outlet 19 directly into contact with the wall.

In an exemplary embodiment, the first region 24a may be biased to a curved shape defining a radius R1 that is greater than the corresponding radius of the right atrium 92, e.g., between about one and thirty five millimeters (7-35 mm), such that the first region 24a may be positioned against or along a wall of the heart 90 opposite the distal tip 15, e.g., to provide back support for the distal portion 24 during introduction of a lead. The first portion 24a may also define an arc having an arc length less than one hundred eighty degrees (180°), e.g., between about ninety five and one hundred seventy degrees (95-170°).

In addition, the first region 24a may be suitably sized and suitably flexible such that it can accommodate a range of anatomies. For example, the radius of curvature may be selected to span the width of relatively large atria, e.g., having an atrial diameter of approximately fifty millimeters (50 mm). For example, the radius R1 may be between greater than fifteen and twenty five millimeters (15-25 mm) such that the resulting curved first region 24a can span the entire atrial diameter and dispose the distal tip 15 against the opposite wall of the heart 90. In this manner, back support can be provided, provision of such back support aiding in securely fixing a lead at a target location, e.g., at or adjacent the His bundle, left bundle branch, and/or atrial or ventricular septum, as these areas may be relatively fibrous and/or the pacing target may be deep to the surface compared to conventional pacing sites. Furthermore, the first region 24a may be sufficiently flexible and sufficiently resilient that it can be compressed within a smaller atrial diameter without kinking and expand to span an atrium which is as large as the curve defined by the first region 24a. As previously described, the apparatus 10 may include a distal curved region 24c which may be disposed at least partially out of the plane defined by or most closely approximated by the more proximally positioned curve of region 24a. For example, the curvature of the distal most curved region 24c may be directed posteriorly, e.g., in order to position the distal tip 15 substantially orthogonally to the heart wall at a target physiologic pacing site. The length of the distal most curve region 24c may be less than the length of the more proximal curved region 24a and the radius of curvature of the distal curved region 24c may be less than about fifteen and twenty five millimeters (15-25 mm), e.g., generally less than the radius of curvature of the more proximal curved region 24a resulting in a curve that is generally smaller than the diameter of the atrium such that the curve is unaffected by variations in atrial size or other surrounding anatomy. In addition or alternatively, the more proximal curve region 24a may be constructed such that its bending stiffness is less than the bending stiffness of the distal most curved region 24c such that that if the distal most curved region 24c is pressed against a wall of the heart 90, it will cause bending deformation of the more proximal curve region 24a while the distal most curved region 24c remains relatively unchanged in its shape, or alternatively, the respective stiffness profiles of the curved regions 24a and 24c may be constructed such that when the apparatus 10 is manipulated by its proximal hub 30 such that the distal tip 15 encounters resistance (e.g., when pushed against a wall of the heart), the more proximal curved region 24a will deform at a lower force and before the distal most region 24c deforms. In this way, the posterior bend which is intended to maintain orthogonal position of the distal tip 15 relative to a wall of the heart 90 overlying a predetermined electrophysiologic target pacing site, is maintained within a range of anatomy that may be encountered and the apparatus overall is able to accommodate this range of anatomy. This construction is in contrast to most catheter construction, which generally increase in stiffness from distal to proximal in order to enable atraumatic tracking within the anatomy. In the case of the apparatus 10, tracking through the anatomy can be facilitated by using a dilator and/or guidewire, while increased stiffness of the distal catheter segment can facilitate navigation within an open chamber.

In order to accomplish the objectives describe above, the regions 24a and 24c may be constructed of materials having approximately the same durometer and/or resulting in approximately the same bending stiffness, but the more proximal curve region 24a may be predisposed to bend or deform before the more distal curved region 24c by virtue of region 24a having a larger radius of curvature, thus creating a longer lever arm to cause deformation, e.g. when force is applied to the distal tip 15. Alternatively, or in addition, the more proximal curve region 24a may be constructed of one or more materials which are softer than, or of an overall construction that produces a bending stiffness less than those/that of the distal curved region 24c.

In an exemplary embodiment, both regions 24a and 24c include the outer jacket may be formed from polyether block amide having a durometer of approximately 63D. In an alternative embodiment, the outer jacket of the distal curved region 24c is formed substantially of polyether block amide with durometer of approximately 63D and the more proximal curved region 24a is constructed with a jacket substantially formed from polyether block amide having a durometer of approximately 55D. It will be appreciated that the catheter shaft may and curve regions may be constructed of a variety of materials including urethanes, nylons, etc., and/or a number of layers, as is known in the art in order to achieve the relative stiffness profile and objectives described above. It will be further appreciated that, optionally, an atraumatic or soft distal most tip may be attached to the distal curved region 24c. Moreover, the relatively long lever arm associated with the proximal region 24a may reduce the ability to transmit normal force to the distal tip 15 in a way that would cause trauma to the heart wall.

In addition, the second region 24b may have a length Y that is shorter than the average height of the right atrium 92, i.e., the distance from the floor of the right atrium 92 to the non-coronary cusp of an aortic valve (or projection thereof), e.g., to position the distal tip 15 relatively high within the right atrium 92, e.g., to target a region of the heart wall adjacent the His bundle, as described further elsewhere herein. In addition, the length Y may be longer than the average distance from the floor of the right atrium 92 to the coronary sinus 94, e.g., between about ten and forty millimeters (10-40 mm).

Finally, the third region 24c may define a radius R2 that is smaller than the first radius R1, e.g., to provide a relatively tight curve to orient the distal tip 15 towards the wall of the septum 98, e.g., between about five and twenty millimeters (5-20 mm). In an exemplary embodiment, the relative dimensions of the regions of the distal portion 24 may be selected to position the distal tip 15 anterior and/or superior to the coronary sinus 94, e.g., to place the outlet against the wall adjacent the His bundle.

Alternatively, the distal portion 24 may be biased to a substantially straight or other configuration (or may adopt such a configuration in a relaxed without substantial bias). Alternatively or in addition, the apparatus 10 may include one or more steering elements (not shown) that may be actuated from the hub 30 to direct the distal portion towards the curvilinear shape. Thus, the distal portion 24 may be introduced through the patient's vasculature and into the right atrium 92, whereupon the steering element(s) may be actuated to direct the distal portion 24 to the curvilinear shape within the right atrium 92, as shown in FIG. 2.

Figure 4:
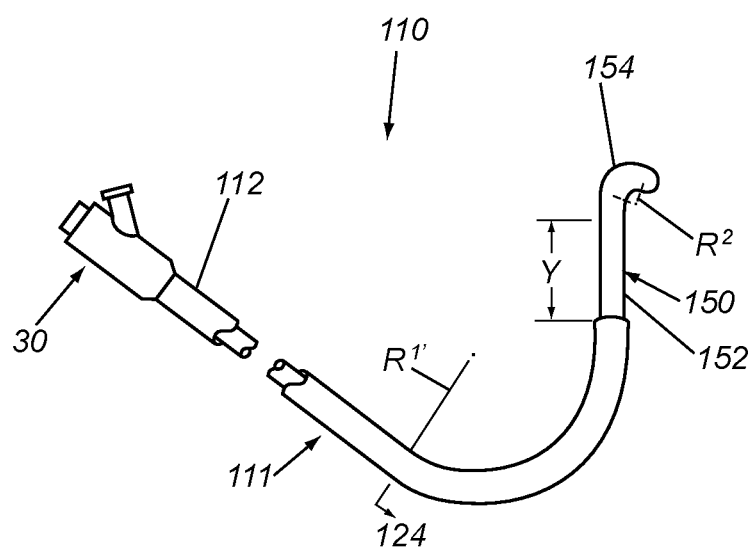
FIG. 4 is a perspective of an exemplary embodiment of a delivery sheath including a telescoping tubular bodies that provide a flexible distal portion having an adjustable curvilinear shape.

In another alternative, one or more of the regions of the distal portion 24 may be steerable or bendable independent of the others. For example, a steering element (not shown) may be provided that may be actuated to change to the radius R1 of the first region 24a without modifying the second or third regions 24b, 24c, e.g., to move the distal tip laterally within the plane of first region 24a. In addition or alternatively, a steering element (not shown) may be provided that may be actuated to change the radius R2 of the third region 24c and/or to rotate the third region 24c relative to the plane of the first region 24a to change the orientation of the distal tip 15. In addition or alternatively, a steering element (not shown) may be provided that may be actuated to cause bending within or immediately adjacent the third region 24c, but out of partially or substantially out of the plane with the curve of the third region 24c, e.g., in order to make fine adjustments to position of the distal tip 15 while maintaining a substantially orthogonal position of the distal tip 15 with respect to a wall of the heart. Turning to FIG. 4, in yet another alternative, an apparatus 110 may be provided that includes a first tubular body 111 including proximal and distal ends 112, 114, and a distal portion 124 biased to a predetermined curved shape, e.g., an arc having a first radius R1'. In this embodiment, the apparatus 110 also includes a second tubular body 150 that includes a distal portion including a straight first region 152 and a curved second region 154, e.g., defining a second radius R2' that is smaller than the first radius R1'. The first region 152 may have a length Y' corresponding to desired dimensions of a heart chamber, but may be adjustable, e.g., by advancing or retracting the second tubular body 150 relative to the first tubular body 111.

Figure 3:
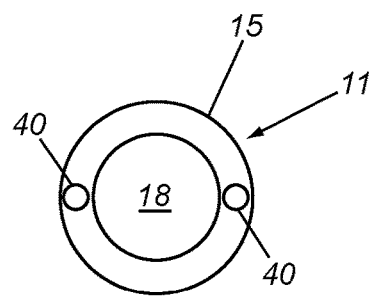
FIG. 3 is a detail of a distal tip of the sheath of FIG. 1 showing a pair of sensors disposed on opposite sides of an outlet of the sheath.

Returning to FIG. 1, optionally, the distal portion 24 of the apparatus 10 (or any of the other devices herein) may include one or more electrodes or other sensors, e.g., at or immediately adjacent the distal tip 15 to facilitate identifying structures within the wall. For example, as shown in FIG. 3, a pair of electrodes 40 may be provided on the distal tip 15 on either side of the outlet 19, e.g., such that the electrodes 40 contact the wall of the heart 90 when the distal tip 15 is placed against the wall. Such electrodes 40 may be at least partially exposed on the distal face of the distal tip 15 in order to come into contact with or in close proximity to the endocardial surface of the heart when the distal tip 15 is positioned substantially orthogonally to a wall of the heart. As described further below, the electrodes 40 may be used to acquire electrical signals through the wall to identify a target structure, such as the His bundle.

In the embodiment shown, the electrodes 40 may be configured to generate bipolar signals. Alternatively, a single electrode may be provided on the distal tip (not shown), and an external electrode (also not shown) may be applied to the patient's body at a remote location to provide unipolar signals.

The apparatus 10 may include one or more wires or conductive leads (not shown) coupled to the electrodes 40 or other sensors and extending from the distal portion 24 proximally to the proximal end 12. The hub 30 may include one or more connectors (also not shown) coupled to the leads such that a processor, controller, or other device may be coupled to the electrodes 40 to receive the signals. The processor may analyze the signals, e.g., in combination with other cardiac signals obtained from the patient, to identify structures within the wall, e.g., to confirm when the distal tip 15 is positioned against the septum 98 immediately adjacent the His bundle.

With additional reference to FIG. 2, in an exemplary embodiment, the apparatus of FIG. 1 may be used to introduce and place a lead or other implant (not shown) within the heart 90. For example, initially, the distal portion 24 of the apparatus 10 may be introduced into the patient's vasculature, e.g., from a percutaneous or other peripheral access site over a guidewire or other rail (not shown), and introduced into the heart 90. For example, the distal portion 24 may be introduced into the patient's venous system and advanced through the superior vena cava 96 into the right atrium 92.

When the distal portion 24 fully enters the right atrium 92 (or other sufficiently large chamber), the distal portion 24 automatically adopt the curvilinear shape, e.g., as shown in FIG. 2. The distal tip 15 may then be placed against the septum 98, e.g., adjacent a His bundle (not shown) of the heart 90. The size and/or shape of the regions of the distal portion 24 may facilitate automatic placement of the distal tip 15 at the desired location. For example, the length Y of the second region 24b may be set to place the distal tip 15 against the septum 98 superior to a coronary sinus 94 of the heart 90. In addition or alternatively, the second radius R2 of the third region 24c may be set to place the distal tip 15 against the septum 98 anterior to the coronary sinus 94.

In addition or alternatively, the first radius R1 of the first region 24a may be set to position the first region 24a against and/or along a wall of the heart 90 opposite the septum 98, e.g., to provide back support for the distal portion and/or prevent migration of the distal portion 24 when a secondary device is introduced. For example, with the distal tip 15 placed against the septum 98 overlying the His bundle, a lead or other implantable device (not shown) may be introduced through the lumen 16 of the apparatus 10 until a distal thereof exits the outlet 19 and contacts the septum 98. Optionally, the lead may include one or more fixation elements, e.g., a screw tip (not shown) that may be threaded into the septum 98 to secure the lead. Once the lead is secured, the apparatus 10 may be removed, e.g., by slitting the hub 30 and tubular body 11, e.g., using tools and methods known in the art.

Optionally, if the apparatus 10 includes sensors 40, electrical signals may be acquired from the sensor(s) 40 to identify the location of the distal tip 15, e.g., to confirm that the distal tip 15 is immediately adjacent the His bundle (or other structure of the heart's conduction system, as desired) before introducing and securing the lead. Thus, the sensors 40 may enhance the accuracy in placing the lead close to the desired structure such that the lead may be used subsequently for pacing and/or other therapies.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. An apparatus for delivering a lead or other secondary device into a patient's heart, comprising:
   an elongate tubular member comprising a proximal end, a distal end sized for introduction into a patient's body, and a lumen extending therebetween,
   wherein the tubular member comprises a flexible distal portion defining a curvilinear shape in a relaxed state including a curved first region defining a first radius lying within a first plane, a straight second region extending from the first curved region defining a first length, and a curved third region extending from the second region to a distal tip of the tubular member and defining a second radius smaller than the first radius, the third region extending out of the first plane, and
   wherein the curved first region has a bending stiffness that is less than a bending stiffness of the curved third region such that that if the curved third region pressed against a wall of the heart, bending deformation of the curved first region occurs while the curved third region remains relatively unchanged in shape.

2. An apparatus for delivering a lead or other secondary device into a patient's heart, comprising:
   an elongate tubular member comprising a proximal end, a distal end sized for introduction into a patient's body, and a lumen extending therebetween,
   wherein the tubular member comprises a flexible distal portion defining a curvilinear shape in a relaxed state including a curved first region defining a first radius lying within a first plane, a straight second region extending from the first curved region defining a first length, and a curved third region extending from the second region to a distal tip of the tubular member and defining a second radius smaller than the first radius, the third region extending out of the first plane, and
   wherein the curved first and third regions have respective stiffness profiles such that, when the apparatus is manipulated at the proximal end such that the distal tip encounters resistance, the curved first region deforms at a lower force and before the curved third region deforms.

3. The apparatus of claim 1, wherein the distal tip is configured for placement against a wall of the patient's heart such that an outlet communicating with the lumen is positionable against the wall.

4. The apparatus of claim 3, further comprising a pair of electrodes on the distal end on opposite sides of the outlet.

5. The apparatus of claim 4, further comprising a processor coupled to the pair of electrodes for processing signals to identify when the distal tip is placed against a desired location of a wall of the heart.

6. The apparatus of claim 5, wherein the processor is configured for identifying a His bundle of the heart based on the signals received from the pair of electrodes to identify when the distal tip is positioned against a location of the wall of the heart overlying the His bundle.

7. The apparatus of claim 2, wherein the distal portion is biased to the curvilinear shape.

8. The apparatus of claim 7, further comprising a secondary device introduceable into the lumen from the proximal end through the distal portion to at least partially straighten the distal portion to facilitate introduction into the patient's heart.

9. The apparatus of claim 2, wherein the curved third region extends out of the first plane in the relaxed state in a posterior direction defining a left hand curve relative to the curved first region.

10. A system for delivering a lead or other secondary device into a patient's heart, comprising:
    a delivery device comprising an elongate tubular member comprising a proximal end, a distal end sized for introduction into a patient's body, and a lumen extending therebetween, the tubular member comprising a flexible distal portion defining a curvilinear shape in a relaxed state including a curved first region defining a first radius lying within a first plane, a straight second region extending from the first curved region defining a first length, and a curved third region extending from the second region to a distal tip of the tubular member and defining a second radius smaller than the first radius, the third region extending out of the first plane; and
    a lead comprising a distal portion sized for introduction through the lumen of the delivery device and a fixation element on the distal portion for securing the distal portion to a wall of the patient's heart,
    wherein the second radius of the third region lies within a second plane orthogonal to the first plane, and
    wherein the curved first and third regions have respective stiffness profiles such that, when the apparatus is manipulated at the proximal end such that the distal tip encounters resistance, the curved first region deforms at a lower force and before the curved third region deforms.

11. The system of claim 10, wherein the delivery device comprises one or more or sensors adjacent the distal tip, the system further comprising a configured to receive signals from the one or more sensors for identifying a His bundle of the heart to identify when the distal tip is positioned against a location of the wall of the heart overlying the His bundle.

12. The system of claim 10, wherein the distal tip is configured for placement against a wall of the patient's heart such that an outlet communicating with the lumen is positionable against the wall.

13. The system of claim 12, further comprising a pair of electrodes on the distal end on opposite sides of the outlet.

14. The system of claim 13, further comprising a processor coupled to the pair of electrodes for processing signals to identify when the distal tip is placed against a desired location of a wall of the heart.

15. The system of claim 14, wherein the processor is configured for identifying a His bundle of the heart based on the signals received from the pair of electrodes to identify when the distal tip is positioned against a location of the wall of the heart overlying the His bundle.

16. The system of claim 10, wherein the distal portion is biased to the curvilinear shape.

* * * * *